United States Patent
Degenkolb et al.

(10) Patent No.: US 7,090,726 B2
(45) Date of Patent: Aug. 15, 2006

(54) DIRECT FEED EXTRUDER SUPPLY SYSTEM

(75) Inventors: J. Robert Degenkolb, Bryan, OH (US); William A. Stusek, Clemmons, NC (US)

(73) Assignee: Graco Minnesota Inc., Minneapolis, MN (US)

( * ) Notice: Subject to any disclaimer, the term of this patent is extended or adjusted under 35 U.S.C. 154(b) by 707 days.

(21) Appl. No.: 10/360,766

(22) Filed: Oct. 30, 2001
(Under 37 CFR 1.47)

(65) Prior Publication Data
US 2004/0170719 A1   Sep. 2, 2004

(51) Int. Cl.
*B05C 11/10* (2006.01)

(52) U.S. Cl. ............... 118/684; 118/685; 118/681; 118/680; 118/679; 118/712

(58) Field of Classification Search ............ 118/712, 118/713, 684, 685, 681, 680, 679, 702, 703, 118/704
See application file for complete search history.

(56) References Cited

U.S. PATENT DOCUMENTS

| 5,531,233 | A  | * | 7/1996  | Oglesby et al. | 131/69  |
| 6,299,931 | B1 | * | 10/2001 | Leary et al.   | 427/8   |
| 6,371,174 | B1 | * | 4/2002  | Zook et al.    | 141/65  |
| 6,379,464 | B1 | * | 4/2002  | Martel         | 118/672 |
| 6,770,142 | B1 | * | 8/2004  | Estelle        | 118/682 |

* cited by examiner

*Primary Examiner*—George Koch
(74) *Attorney, Agent, or Firm*—Douglas B. Farrow

(57) ABSTRACT

A pair of hoses connects directly from the feed pumps to the extruder without utilizing a PCV (pressure compensating valve). Each feed unit has automatic air pressure relief through a solenoid valve on top of the feed unit so that the unit does not stall at full static line pressure. When the dispense valve at the extruder is shut off, air pressure to the air motor is dumped. A pair of electric eyes is utilized—the first signals the pump (by providing pressurized air) to provide pressure while the second actually opens the extruder when the article to be coated comes into position. The first valve is located only a short distance ahead of the second valve so that the line pressure does not have a chance to exceed the dynamic pressure before the extruder opens.

1 Claim, 1 Drawing Sheet

DIRECT FEED EXTRUDER SUPPLY SYSTEM

BACKGROUND OF THE INVENTION

Figure 1:
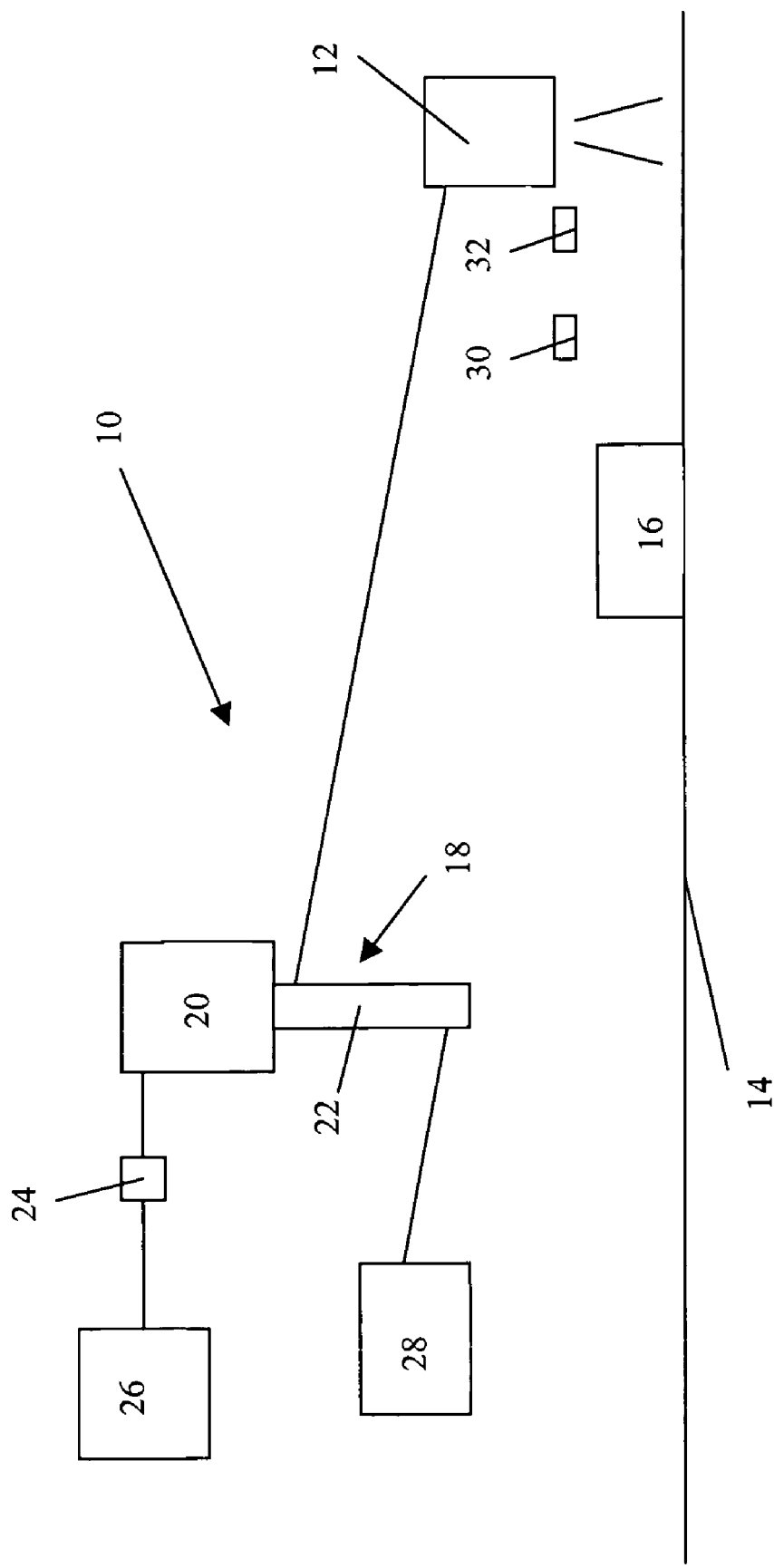

The use of various types of pumps to supply extruders for dispensing warm and hot melt adhesives is of course well known. In no flow conditions, the static pressure in the line is the same at all points. During flow, there is a natural pressure drop from the outlet of the pump to the dispense head. Prior art systems have required the use of pressure compensators in order to ensure that pressure remains consistent (along with the resulting bead size extruded) in passing from static to dynamic pressure conditions.

SUMMARY OF THE INVENTION

The system of the instant invention utilizes a pair of Graco's THERM-O-FLOW™ 55 feed units. A pair of 20 foot one inch ID hoses connects directly to the extruder without utilizing a PCV (pressure compensating valve). Each feed unit has automatic air pressure relief through a solenoid valve on top of the feed unit so that the unit does not stall at full static line pressure. When the dispense valve at the extruder is shut off, air pressure to the air motor is dumped. A pair of position detectors (electric eyes are preferred but magnetic, IR or other known detection technologies may be used) is utilized—the first signals the pump (by providing pressurized air) to provide pressure while the second actually opens the extruder when the article to be coated comes into position. The first valve is located only a short distance ahead of the second valve so that the line pressure does not have a chance to exceed the dynamic pressure before the extruder opens.

These and other objects and advantages of the invention will appear more fully from the following description made in conjunction with the accompanying drawings wherein like reference characters refer to the same or similar parts throughout the several views.

A BRIEF DESCRIPTION OF THE DRAWINGS

FIG. 1 is a schematic showing the instant invention.

DESCRIPTION OF THE PREFERRED EMBODIMENT

The system of the instant invention (generally designated 10) utilizes a pair of Graco's THERM-O-FLOW™ 55 feed units (only one is shown in the drawing figure for sake of simplicity) 18 comprised of an air motor 20 and a pump lower 22. A pair of 20 foot one inch ID hoses connects directly to the extruder 12. Extruder 12 I designed to apply adhesive to objects 16 to be coated on a conveyor 14.

Each feed unit 18 has automatic air pressure relief through a solenoid valve 24 on top of the feed unit 18 so that the unit does not stall at full static line pressure. When the dispense valve at the extruder 12 is shut off, air pressure to the air motor 20 is dumped. First and second position detectors, 30 and 32 respectively (electric eyes are preferred but magnetic, IR or other known detection technologies may be used) are utilized—the first 30 signals the pump (by providing pressurized air) to provide pressure while the second 32 actually opens the extruder 12 when the article 16 to be coated comes into position. The first position detector 30 is located only a short distance ahead of the second position detector 32 50 that the line pressure does not have a chance to exceed the dynamic pressure before the extruder 12 opens. A compressed air source 26 and source of material 28 are included.

It is contemplated that various changes and modifications may be made to the direct feed extruder supply system without departing from the spirit and scope of the invention as defined by the following claims.

What is claimed is:

1. An extruder feed supply system for supplying adhesives to an extruder receiving articles on a conveyor to be sealed, said extruder feed supply system comprising:
    at least one air motor driven pump, each said pump being connected to an extruder and a source of adhesives so as to pump said adhesives from said adhesive source to said extruder and said air motor driven pump being connected to a source of compressed air;
    a solenoid valve connected between said compressed air source and said air motor driven pump, said solenoid valve actuable between a normally open position whereby the air from said air motor driven pump is dumped to atmosphere and a closed position connecting said air source and said air motor driven pump; and
    first and second position detectors, said first position detector being connected so as to actuate said solenoid valve into said closed position and said second position detector being positioned so as to enable operation of said extruder to apply material to one of said articles, said first position detector being positioned sufficient upstream of said second position detector on said conveyor to enable said air motor driven pump to be pressurized to a level substantially equal to the dynamic pressure of said system.

\* \* \* \* \*